US012370766B2

(12) United States Patent
Plavnik et al.

(10) Patent No.: US 12,370,766 B2
(45) Date of Patent: Jul. 29, 2025

(54) FORMULATION DOSING DEVICE FOR CONTACT LENS FABRICATION

(71) Applicant: Alcon Inc., Fribourg (CH)

(72) Inventors: Michelle Plavnik, Atlanta, GA (US); Junhao Ge, Shanghai (CN); Steve Yun Zhang, Sugar Hill, GA (US); Ethan Leveillee, Atlanta, GA (US); Yang Zheng, Alpharetta, GA (US); Yuan Chang, Chicago, IL (US)

(73) Assignee: Alcon Inc., Fribourg (CH)

( * ) Notice: Subject to any disclaimer, the term of this patent is extended or adjusted under 35 U.S.C. 154(b) by 263 days.

(21) Appl. No.: 18/047,312

(22) Filed: Oct. 18, 2022

(65) Prior Publication Data

US 2023/0117502 A1  Apr. 20, 2023

Related U.S. Application Data

(60) Provisional application No. 63/257,504, filed on Oct. 19, 2021.

(51) Int. Cl.
*B29D 11/00* (2006.01)

(52) U.S. Cl.
CPC .. *B29D 11/00096* (2013.01); *B29D 11/00125* (2013.01)

(58) Field of Classification Search
CPC ........ B29D 11/00096; B29D 11/00125; B29D 11/00432; B29C 39/24; B29C 2043/3433
See application file for complete search history.

(56) References Cited

U.S. PATENT DOCUMENTS

| | | | | |
|---|---|---|---|---|
| 4,022,855 A | * | 5/1977 | Hamblen | B29C 41/045 522/183 |
| 5,716,540 A | * | 2/1998 | Matiacio | B29C 33/0077 264/225 |
| 6,042,756 A | * | 3/2000 | Muller | B29C 39/12 264/1.36 |
| 2007/0035051 A1 | * | 2/2007 | Darnton | B29D 11/00125 264/1.32 |
| 2007/0210465 A1 | * | 9/2007 | Imatomi | B29D 11/00125 264/1.32 |
| 2008/0029914 A1 | * | 2/2008 | Hamanaka | B29C 33/0011 425/808 |

(Continued)

FOREIGN PATENT DOCUMENTS

| | | |
|---|---|---|
| EP | 0750982 A2 | 1/1997 |
| EP | 1055138 A2 | 11/2000 |

(Continued)

*Primary Examiner* — Emmanuel S Luk
(74) *Attorney, Agent, or Firm* — Jian Zhou

(57) ABSTRACT

A dosing system and method for delivery of contact lens formulation(s) to a contact lens forming mold. The system includes a carrier portion configured for holding a contact lens mold, and an alignment mandrel configured for retaining a lens formulation delivery device. The lens formulation delivery device is retained in a specified position relative to the contact lens mold for precise location of delivery of the lens formulation within the contact lens mold. A first lens formulation can be dosed to a center location in the mold, and a different second lens formulation can be dosed to a ring-shaped pattern around the center location, to form a contact lens having different center and edge characteristics.

12 Claims, 8 Drawing Sheets

(56) References Cited

U.S. PATENT DOCUMENTS

| | | |
|---|---|---|
| 2010/0155975 A1 | 6/2010 | Heinrich et al. |
| 2014/0191429 A1* | 7/2014 | Nakahashi ............. B29C 43/36 |
| | | 425/165 |
| 2018/0133989 A1* | 5/2018 | Nagao .............. B29D 11/00442 |
| 2024/0208685 A1* | 6/2024 | Spencer ................. B65B 35/56 |

FOREIGN PATENT DOCUMENTS

| | | |
|---|---|---|
| JP | 2019522238 A | 8/2019 |
| WO | 2018009309 A1 | 1/2018 |

* cited by examiner

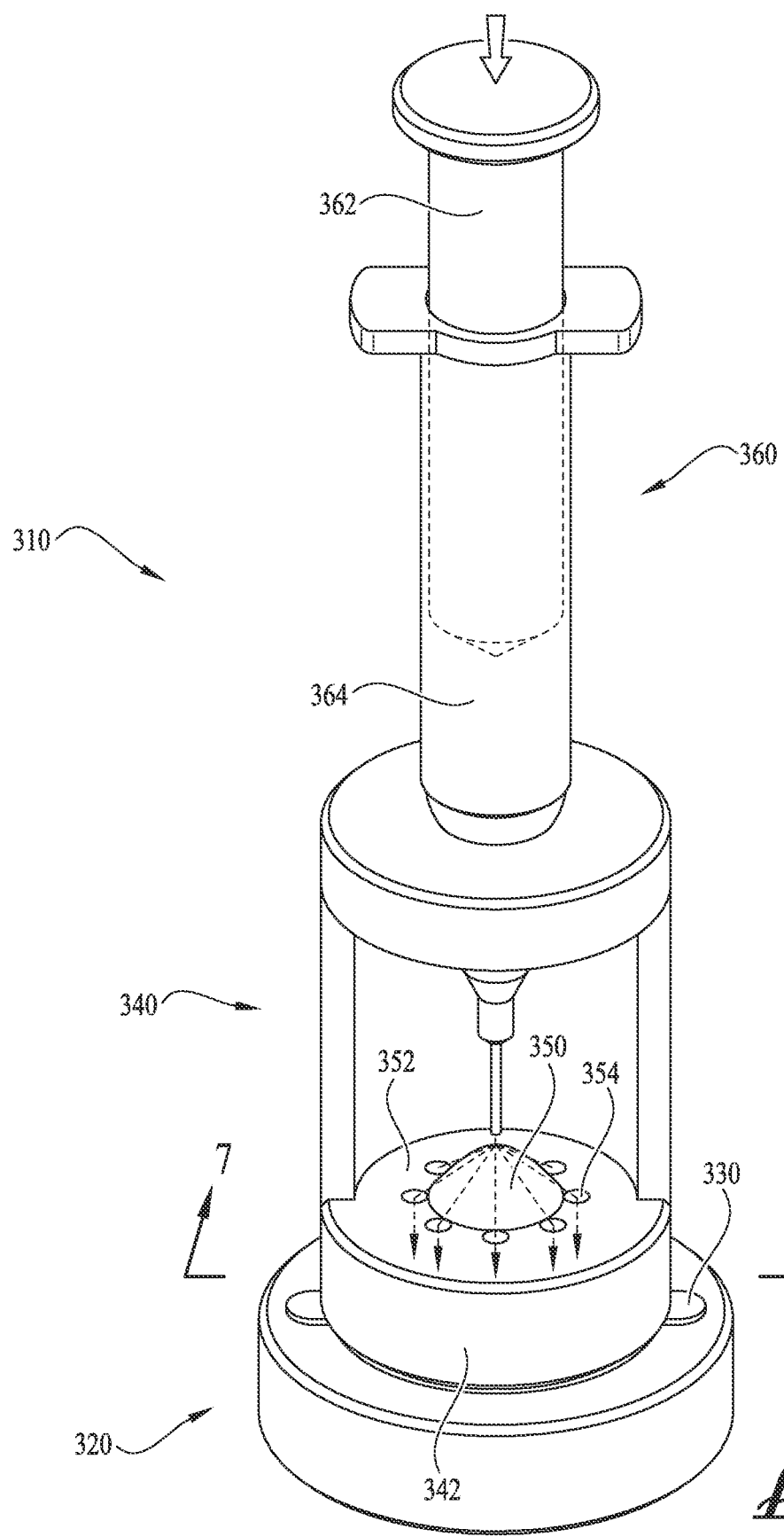

FORMULATION DOSING DEVICE FOR CONTACT LENS FABRICATION

TECHNICAL FIELD

The present invention relates generally to the field of fabrication of products including ophthalmic contact lenses, and more particularly to devices, apparatus, methods and systems for dosing or delivery of a lens formulation to a mold or other forming device in the fabrication or manufacture of a contact lens or other product.

BACKGROUND

Various products are fabricated or manufactured by molding or casting processes. For example, optical contact lenses and other products may be fabricated by delivery or dosing of a lens formulation (aka, a polymerizable composition or a reaction mixture for forming contact lenses or other products) comprising one or more lens forming materials such as uncured monomeric lens precursor material(s) into a mold or other forming device or structure, curing the lens forming materials to form a polymeric contact lens or other product, and demolding the lens or other product for further treatment or use.

In some particular examples, separate dosing of different lens formulations may be carried out, for example to produce a contact lens formed of a first type of lens formulation at the lens center, and a different second type of lens formulation around the lens edge. Manually dosing or casting the center and edge lens formulations with pipettes may produce inconsistent dosing of the lens formulations, imprecise centration, and distortion of the dosed lens formulations, potentially resulting in product inconsistencies, visual distortions and other undesirable outcomes.

Accordingly, it can be seen that needs exist for improved devices, apparatus, methods and systems for dosing or delivery of a lens formulation to a mold or other forming device in the fabrication or manufacture of a contact lens or other product. It is to the provision of improved devices, apparatus, methods and systems meeting these and other needs that the present invention is primarily directed.

SUMMARY

In example embodiments, the present invention provides improved devices, apparatus, methods and systems for dosing or delivery of a lens formulation material to a mold or other forming device in the fabrication or manufacture of a contact lens or other product. In particular examples, a lens formulation dosing or delivery device is provided for fabrication of gradient contact lenses with improved dosing precision and consistency.

In further examples, one apparatus or configuration may be provided for center lens formulation dosing, and another apparatus or configuration may be provided for edge lens formulation dosing. The center dosing apparatus holds a syringe or other center lens formulation delivery device directly on top of and in the center of the front curve (FC) lens mold, so that the center lens formulation dose is precisely centered and consistently controlled in the form of a generally circular dot. The edge dosing apparatus holds a syringe or other edge lens formulation delivery device directly on top of and centered over the FC mold and distributes the edge lens formulation in a ring or annular pattern so the dose is centered and consistently controlled in the form of a ring around the center lens formulation dose.

Devices and apparatus according to example embodiments may be provided as an entire standalone product fabrication system, or alternatively may be provided in the form of retrofit components for installation in combination with existing fabrication systems. While described primarily with respect to fabrication of ophthalmic contact lenses, the invention may also be adapted to fabrication of other optical lenses and various other products, and to other patterning and printing applications.

In one aspect, the present invention relates to a dosing system and method for delivery of contact lens formulation(s) to a contact lens forming mold. The system preferably includes a carrier portion configured for holding a contact lens mold, and an alignment mandrel configured for retaining a lens formulation delivery device. The lens formulation delivery device is retained in a specified position relative to the contact lens mold for precise location of delivery of the lens formulation within the contact lens mold.

A first lens formulation can be dosed to a center location in the mold, and a different second lens formulation can be dosed to a ring-shaped pattern around the center location, to form a contact lens having different center and edge characteristics.

In another aspect, the invention relates to a dosing system for delivery of a contact lens formulation to a contact lens forming mold. The dosing system preferably includes a carrier portion configured for holding a contact lens mold. The dosing system preferably also includes a center dosing alignment mandrel configured to retain a center lens formulation delivery device in a generally fixed position relative to the carrier portion during delivery of a center lens formulation to a lens center portion of the contact lens mold. The dosing system preferably also includes an edge dosing alignment mandrel configured to retain an edge lens formulation delivery device in a generally fixed position relative to the carrier portion during delivery of an edge lens formulation to a lens edge portion of the contact lens mold.

In another aspect, the invention relates to a method of forming a contact lens from a center lens formulation and an edge lens formulation. The method preferably includes holding a contact lens front curve mold portion in a carrier; engaging a center dosing alignment mandrel with the carrier over the contact lens front curve mold portion; delivering the center lens formulation from a first delivery device retained in a first delivery position by the center dosing alignment mandrel to a center position within the contact lens front curve mold portion; disengaging the center dosing alignment mandrel from the carrier; engaging an edge dosing alignment mandrel with the carrier over the contact lens front curve mold portion; and delivering the edge lens formulation from a second delivery device retained in a second delivery position by the center dosing alignment mandrel into a ring-shaped pattern around the center position within the contact lens front curve mold portion.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 6 is a perspective view of an edge lens formulation dosing or delivery device or system according to another example embodiment of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
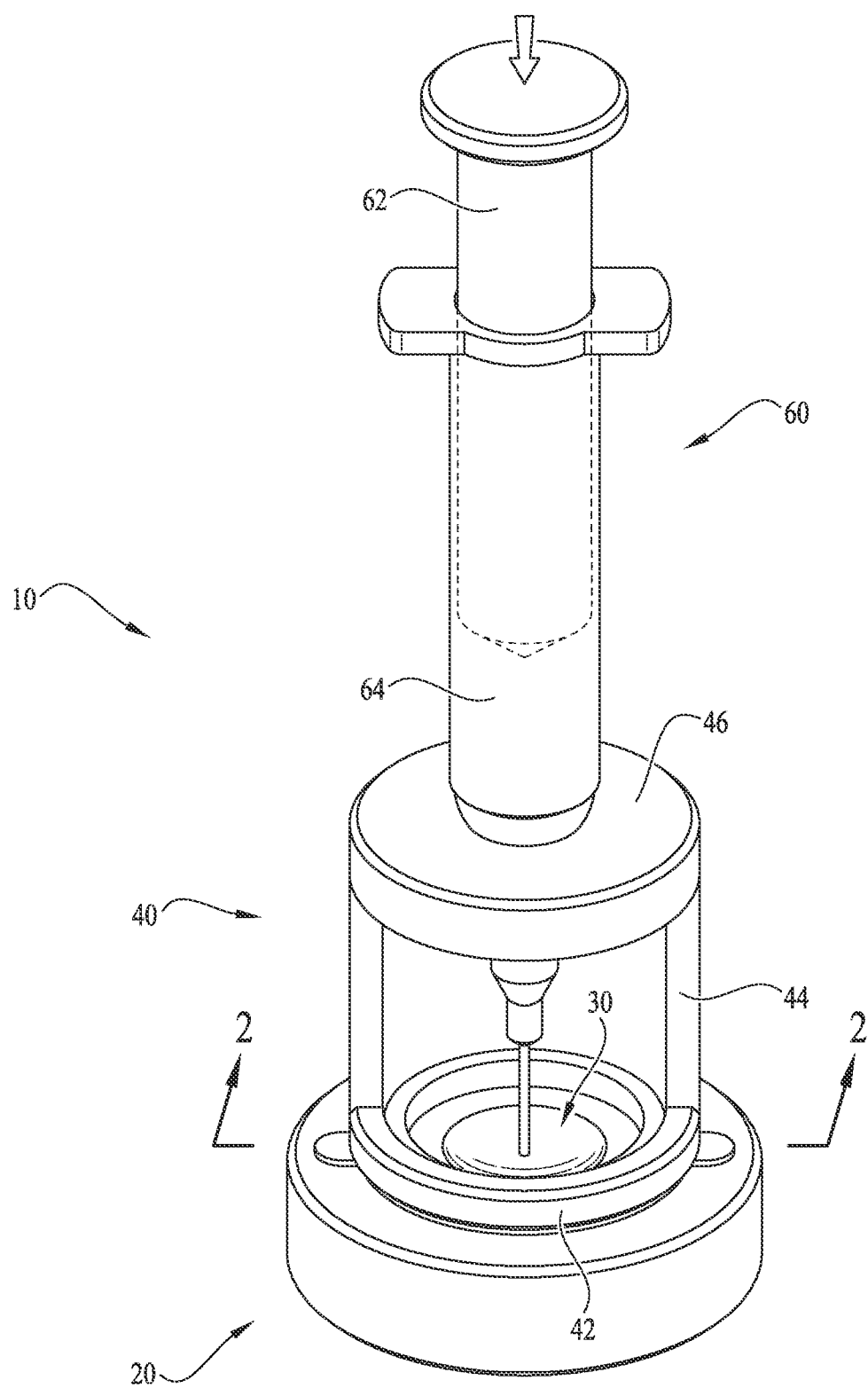
FIG. 1 is a perspective view of a center lens formulation dosing or delivery device or system according to an example embodiment of the present invention.
Figure 2:
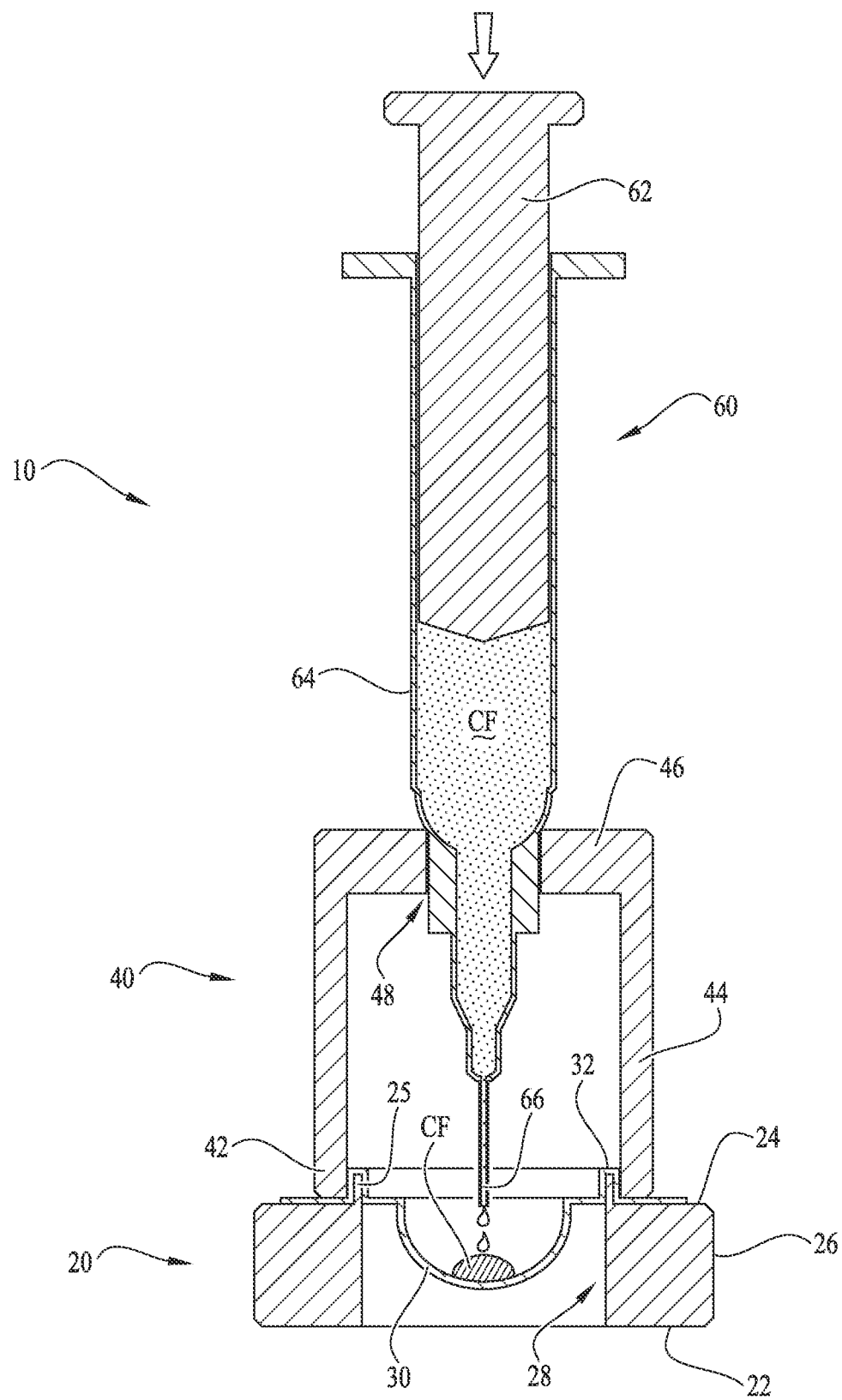
FIG. 2 is a cross-sectional view of the dosing device of FIG. 1.

With reference now to the drawing figures, wherein like reference numbers represent corresponding parts throughout the several views, FIGS. 1 and 2 show a center lens formulation dosing or delivery device or system 10 according to an example embodiment of the present invention. The device or system 10 generally comprises a base or mold carrier portion 20, a mold portion 30, a center dosing alignment mandrel or fixture portion 40, and a center lens formulation delivery device 60.

The mold carrier portion 20 comprises a generally ring-shaped structure having a lower or bottom side or face 22, a planar upper or top side or face 24, an outer annular surface 26, and an inner recess or opening 28 configured to receive and releasably engage a front curve (FC) or female (concave) mold portion 30 for fabricating a contact lens or other product. The surface(s) of the inner recess or opening 28 is/are preferably configured to have a size and/or shape, and/or to include one or more engagement features closely conforming to and/or positively engaging with corresponding surfaces and/or features of the mold portion 30 in order to maintain a consistent relative positioning of the mold portion within and relative to the mold carrier portion 20 during use in a process of fabricating a center portion of a contact lens or other product. For example, in the depicted embodiment, an annular flange 25 projects upwardly from the top face 24 of the mold carrier portion 20, and has a height, thickness and diameter configured to generally correspond to and be engaged within a cooperatively configured ring-shaped channel or receiver portion formed in a lower interior face of a collar 32 of the mold portion 30. In further example embodiments, one or more mold carrier portion(s) 20 can be attached or affixed to, or alternatively may be integrally formed with, a belt or other carrier portion of an automated fabrication system.

The center dosing alignment mandrel or fixture portion 40 is configured for positioning over and releasably coupling with the mold carrier portion 20 and detachably engaging and retaining a syringe or other center lens formulation delivery device 60 in a fixed position for precise alignment over the front curve mold portion 30. In example embodiments, the center dosing alignment mandrel portion 40 comprises a base portion 42, at least one upright wall portion 44, and a top panel portion 46 having a generally central opening or receiver 48 for receiving and engaging the delivery device 60. In the depicted embodiment, the center dosing alignment mandrel portion 40 is a generally tubular or cylindrical body. In the depicted embodiment, the base portion 42 comprises an annular ring with a planar base surface surrounding an opening having a size and shape closely conforming to the exterior surface of the collar 32 of the mold 30 with the annular flange 25 of the mold carrier portion 20 engaged within the interior ring-shaped channel or receiver of the mold collar 32, for example with a close running or slight interference fit. In particular example embodiments, the mold collar 32 may be generally circular with an outer diameter of between about 20 mm to about 25 mm, for example about 23.72 mm, but in alternate embodiments may be otherwise configured and/or may be larger or smaller to suit the intended mold configuration. The upright wall portion 44 is preferably configured to have a height corresponding to a lengthwise dimension of the syringe or center lens formulation delivery device 60 in order to maintain the tip or delivery opening of the syringe at the desired height over the mold receptacle. In particular example embodiments, the height of the upright wall portion 44 may be configured to maintain a distance of between about 1.0 mm to about 3.0 mm, for example about 2.0 mm between the dispensing tip 66 of the center lens formulation delivery device 60 and the receptacle of the mold 30, but in alternate embodiments may provide a larger or smaller spacing distance. The upright wall portion 44 may comprise a continuous cylindrical wall, or one or more wall segments optionally providing one or more openings therebetween for access or viewing of the syringe tip positioning and formulation delivery. In the depicted embodiment, the top panel portion 46 is a generally circular or annular disk, and the opening or receiver 48 is centrally positioned for alignment of the delivery device 60 over the center of the mold receptacle of the front curve mold portion 30. The opening 48 is sized and shaped to closely conform to a corresponding barrel portion of the delivery device 60 in order to receive and engage the delivery device, for example with a close running or slight interference fit. In particular example embodiments, the opening 48 may have a diameter of between about 0.4 mm to about 0.6 mm, for example about 0.48 mm, but in alternate embodiments may be larger or smaller to accommodate the delivery device intended for use in a particular application.

In an example process or method of use in delivery or dosing of a center lens formulation CF (or a center polymerizable composition or a center reaction mixture) comprising one or more lens-forming materials such as an uncured monomeric lens center precursor materials or other liquid or gel product formulation material, the front curve mold portion 30 is installed onto the mold carrier portion 20 with the ring channel of the mold collar 32 engaged over the upwardly projecting annular flange 25 of the carrier. The center dosing alignment mandrel portion 40 is positioned over the carrier 20 and the mold 30, with the base 42 of the mandrel engaged over the mold collar 32 and the flange 25 of the carrier. The syringe or center lens formulation delivery device 60 is positioned within the opening 48 of the mandrel 40. The delivery device 60 is actuated, for example by advancing the syringe plunger 62 within the syringe barrel 64, to dispense the center lens formulation CF from the syringe tip 66 into the center of the mold receptacle of the front curve mold portion 30. Control of the advancement of the plunger 62, for example by use of an air pump, pneumatic or hydraulic actuator, allows control of the amount of center lens formulation delivered. The configuration and positioning of the center lens formulation dosing or delivery device or system 10 ensures delivery of the center lens formulation CF directly on top of and in the center of the front curve (FC) lens mold, so that the center lens formulation dose is precisely centered within the mold receptacle and consistently controlled in the form of a generally circular dot or dose. In example embodiments, the mold 30 includes a mold-carrier-engagement portion (e.g., the inner ring-shaped channel in the underside of the mold collar 32) configured for direct and positive engagement with a carrier-mold-engagement portion of the carrier 20 (e.g., with the ring-shaped flange 25 of the carrier), such that the position of the mold relative to the carrier is stable and fixed during the dosing operation, thereby helping to maintain precise control of the delivery or dosing location of the center lens formulation CF. In further example embodiments, the mold 30 includes a mold-mandrel-engagement portion (e.g., the ring-shaped outer surface of the mold collar 32) configured for direct and positive engagement with a mandrel-mold-engagement portion of the dosing alignment mandrel 40 (e.g., with the inner annular opening in the base 42 of the mandrel), such that the position of the mandrel relative to the mold is fixed during the dosing operation, also helping to maintain precise control of the delivery or dosing location of the center lens formulation CF. Additionally, in example embodiments, the mold-carrier-engagement portion of the mold may be fixed in position relative to, of a unitary construction with, or being the same component as the mold-mandrel-engagement portion of the mold, for example inner and outer portions of the same mold collar 32, thereby minimizing or eliminating any play or tolerance stack-up between parts that might detrimentally affect locational control of lens formulation deliver.

Figure 3:
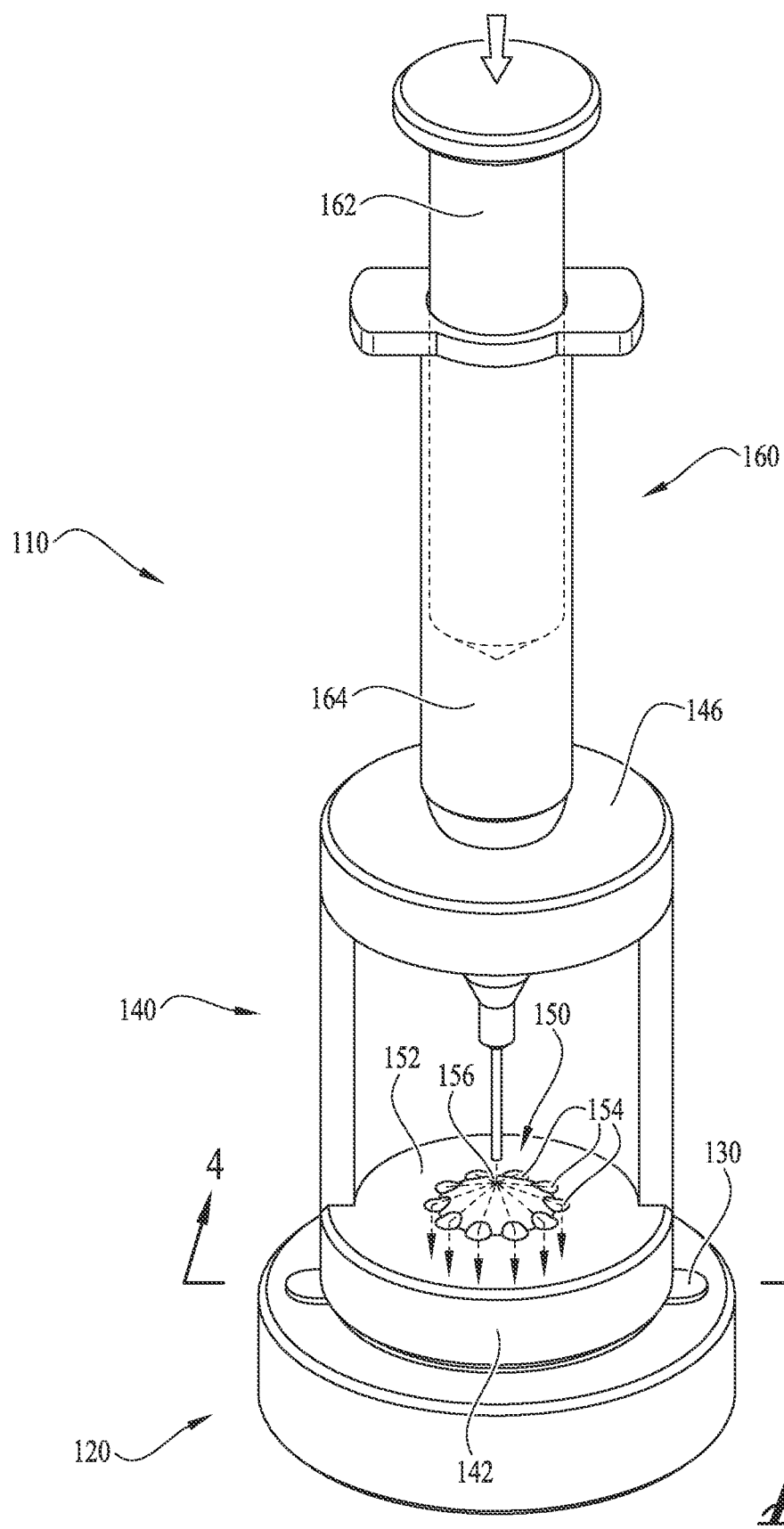
FIG. 3 is a perspective view of an edge lens formulation dosing or delivery device or system according to an example embodiment of the present invention.
Figure 4:
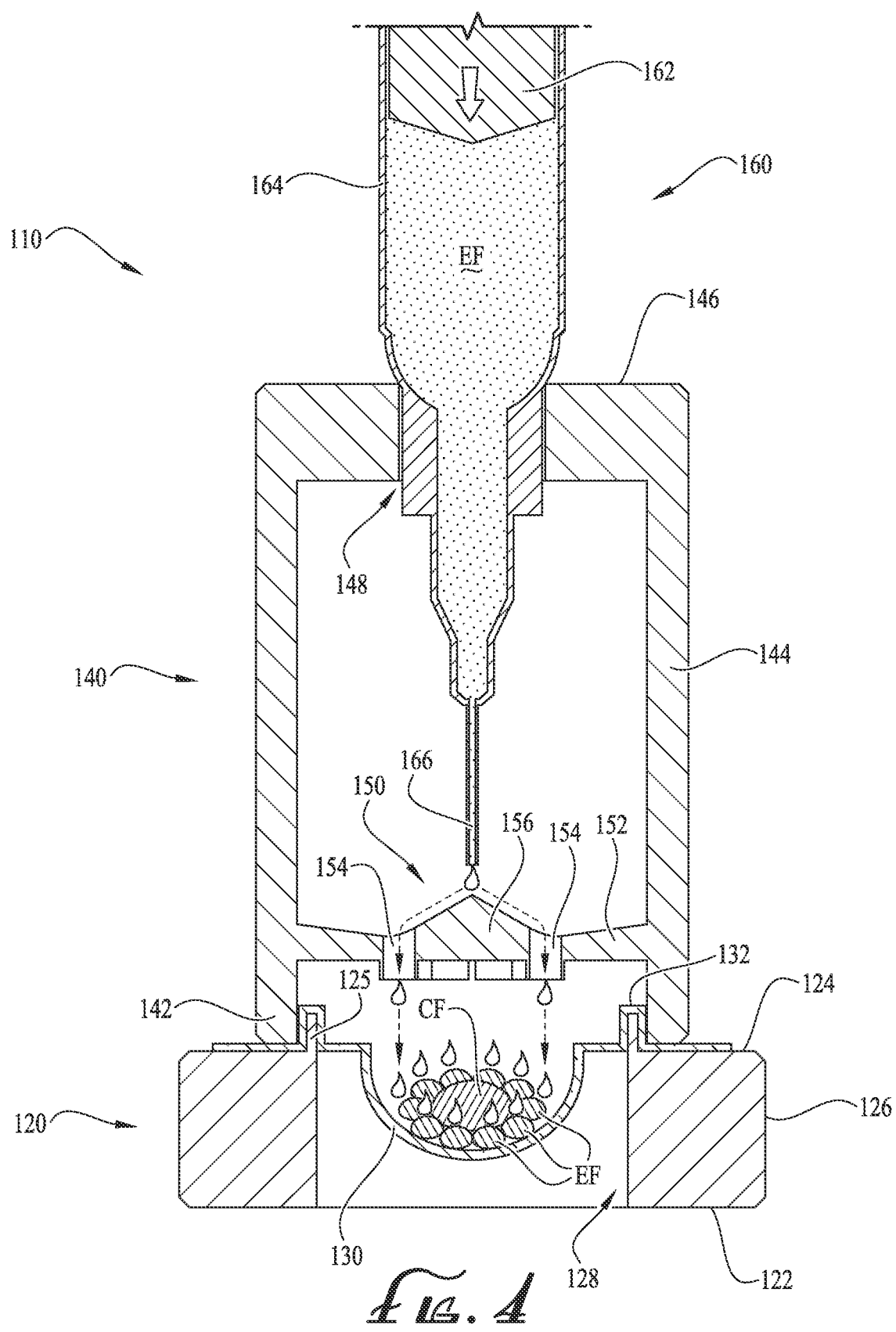
FIG. 4 is a cross-sectional view of the dosing device of FIG. 3.

FIGS. 3 and 4 show an edge lens formulation dosing or delivery device or system 110 according to an example embodiment of the present invention. The device or system 110 generally comprises a base or mold carrier portion 120, a mold portion 130, an edge dosing alignment and distribution mandrel or fixture portion 140, and an edge lens formulation delivery device 160. If the edge lens formulation dosing system 110 is used in combination with a center lens formulation dosing system such as for example system 10 described above, the mold carrier 120 and the mold 130 of the edge lens formulation dosing system may be one and the same components as the mold carrier 20 and the mold 30 of the center lens formulation dosing system.

The mold carrier portion 120 comprises a generally ring-shaped structure having a lower or bottom side or face 122, a generally planar upper or top side or face 124, an outer annular surface 126, and an inner recess or opening 128 configured to receive and releasably engage the front curve (FC) mold portion 130 for fabricating a contact lens or other product. The surface(s) of the inner recess or opening 128 is/are preferably configured to have a size and/or shape, and/or to include one or more engagement features closely conforming to and/or positively engaging with corresponding surfaces and/or features of the mold portion 130 in order to maintain a consistent relative positioning of the mold portion within and relative to the mold carrier portion 120 during use in a process of fabricating an edge portion of a contact lens or other product. For example, in the depicted embodiment, an annular flange 125 projects upwardly from the top face 124 of the mold carrier portion 120, and has a height, thickness and diameter configured to generally correspond to and be engaged within a ring-shaped channel or receiver portion of a collar 132 of the mold 130. In further example embodiments, one or more mold carrier portion(s) 120 can be attached or affixed to, or alternatively may be integrally formed with, a belt or other carrier portion of an automated fabrication system.

The edge dosing alignment and distribution mandrel or fixture portion 140 is configured for positioning over and releasably coupling with the mold carrier portion 120 and engaging and detachably retaining a syringe or other edge formulation delivery device 160 in a fixed position for precise alignment over the front curve mold portion 130. In example embodiments, the edge dosing alignment mandrel and distribution portion 140 comprises a base portion 142, at least one upright wall portion 144, a top panel portion 146 having a generally central opening or receiver 148 for receiving and engaging the delivery device 160, and an edge lens formulation distribution portion 150. In particular example embodiments, the opening 148 may have a diameter of between about 1.0 mm to about 1.5 mm, for example about 1.25 mm, but in alternate embodiments may be larger or smaller to accommodate the delivery device intended for use in a particular application. In the depicted embodiment, the edge dosing alignment mandrel portion 140 is a generally tubular or cylindrical body. In the depicted embodiment, the base portion 142 comprises an annular ring with a planar base surface surrounding an opening having a size and shape closely conforming to the collar 132 of the mold 130 with the annular flange 125 of the carrier 120 engaged therein, for example with a close running or slight interference fit. The upright wall portion 144 is preferably configured to have a height corresponding to a lengthwise dimension of the syringe or edge lens formulation delivery device 160 in order to maintain the tip or delivery opening of the syringe at the desired height over the mold receptacle. The upright wall portion 144 may comprise a continuous cylindrical wall, or one or more wall segments optionally providing one or more openings therebetween for access or viewing of the syringe tip positioning and edge formulation delivery. In the depicted embodiment, the top panel portion 146 is a generally circular or annular disk, and the opening or receiver 148 is centrally positioned for alignment of the delivery device 160 over the center of the mold receptacle of the front curve mold portion 130. The opening 148 is sized and shaped to closely conform to a corresponding barrel portion of the delivery device 160 in order to receive and engage the delivery device, for example with a close running or slight interference fit.

The edge lens formulation distribution portion 150 is positioned generally vertically between the base portion 142 and the top panel portion 146, for example on a supporting flange or shelf 152 extending across the interior chamber of the alignment mandrel and distribution portion 140. In the depicted embodiment, the edge lens formulation distribution portion 150 comprises a generally circular or polygonal array of holes or openings 154 surrounding a generally conical or symmetrically sloped protuberance or peak 156 projecting upwardly from the supporting shelf 152. The openings 154 are preferably evenly spaced and symmetrically arranged about the conical protuberance 156, and the peak of the protuberance is preferably coaxially aligned with a center axis of the array of openings and centrally positioned on the shelf 152 directly vertically beneath the center of the opening 148 in the top panel 146. In the depicted embodiment, the array of openings 154 comprises ten openings, but fewer or more may be provided within the scope of the invention. Also, while the openings 154 are depicted as circular holes, openings of various other shapes and configurations are within the scope of the invention.

In an example process or method of use in delivery or dosing of an edge lens formulation EF (or an edge polymerizable composition or an edge reaction mixture) comprising one or more lens-forming materials such as an uncured monomeric lens edge precursor materials or other liquid or gel product formulation material, the front curve mold portion 130 is installed onto the mold carrier portion 120 with the ring channel of the mold collar 132 engaged over the upwardly projecting annular flange 125 of the carrier. As noted above, the carrier and mold portions may be the same components for both center and edge dosing. The edge dosing alignment mandrel and distribution portion 140 is positioned over the carrier 120 and the mold 130, with the base 142 of the mandrel engaged over the mold collar 132 and carrier flange 125. The syringe or edge lens formulation delivery device 160 is positioned within the opening 148 of the mandrel 140. The delivery device 160 is actuated, for example by advancing the syringe plunger 162 within the syringe barrel 164, to dispense the edge lens formulation EF from the syringe tip 166. The edge lens formulation EF is preferably delivered onto the peak or tip of the protuberance 156 and flows by gravity down the slope of the protuberance in a generally evenly distributed pattern, passes through the openings 154, and is delivered into a ring-shaped pattern distributed around the center of the mold receptacle of the front curve mold portion 130. If a dose of center lens formulation CF has been previously delivered to the mold 130, the edge lens formulation EF is preferably evenly distributed in a symmetric ring surrounding the center lens formulation. Control of the advancement of the plunger 162, for example by use of an air pump, pneumatic or hydraulic actuator, allows control of the amount of lens formulation delivered. The configuration and positioning of the edge lens formulation dosing or delivery device or system 110 ensures a controlled, precise and consistent delivery of the edge lens formulation EF within the mold receptacle. In example embodiments, the mold 130 includes a mold-carrier-engagement portion (e.g., the inner ring-shaped channel in the underside of the mold collar 132) configured for direct and positive engagement with a carrier-mold-engagement portion of the carrier 120 (e.g., with the ring-shaped flange 125 of the carrier), such that the position of the mold relative to the carrier is stable and fixed during the dosing operation, thereby helping to maintain precise control of the delivery or dosing location of the edge lens formulation EF. In further example embodiments, the mold 130 includes a mold-mandrel-engagement portion (e.g., the ring-shaped outer surface of the mold collar 132) configured for direct and positive engagement with a mandrel-mold-engagement portion of the dosing alignment mandrel 140 (e.g., with the inner annular opening in the base 142 of the mandrel), such that the position of the mandrel relative to the mold is fixed during the dosing operation, also helping to maintain precise control of the delivery or dosing location of the edge lens formulation EF. Additionally, in example embodiments, the mold-carrier-engagement portion of the mold may be fixed in position relative to, of a unitary construction with, or being the same component as the mold-mandrel-engagement portion of the mold, for example inner and outer portions of the same mold collar 32, thereby minimizing or eliminating any play or tolerance stack-up between parts that might detrimentally affect locational control of lens formulation deliver.

Figure 5A:
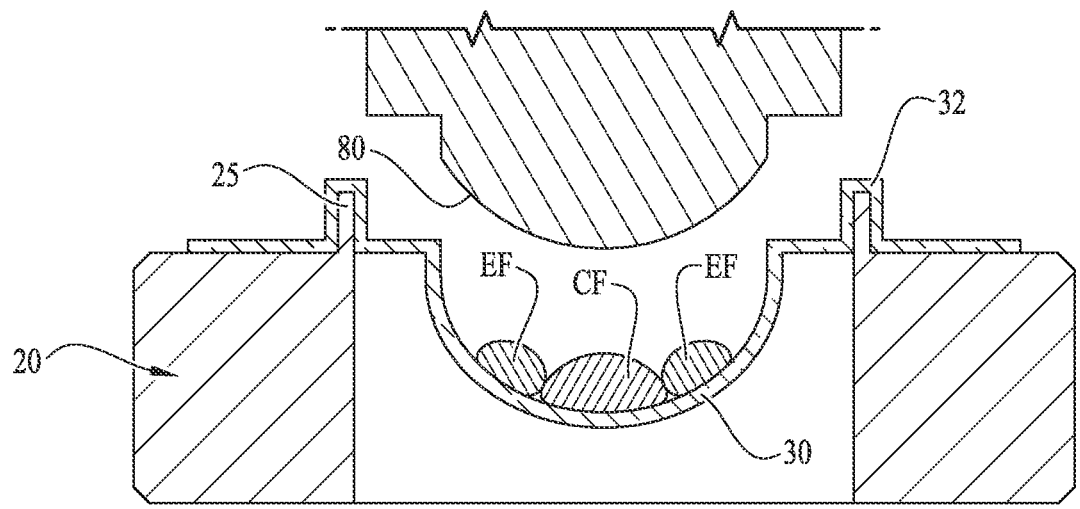
FIGS. 5A, 5B and 5C show steps of a dosing and molding fabrication process and a resulting lens product according to example forms of the present invention.
Figure 5B:
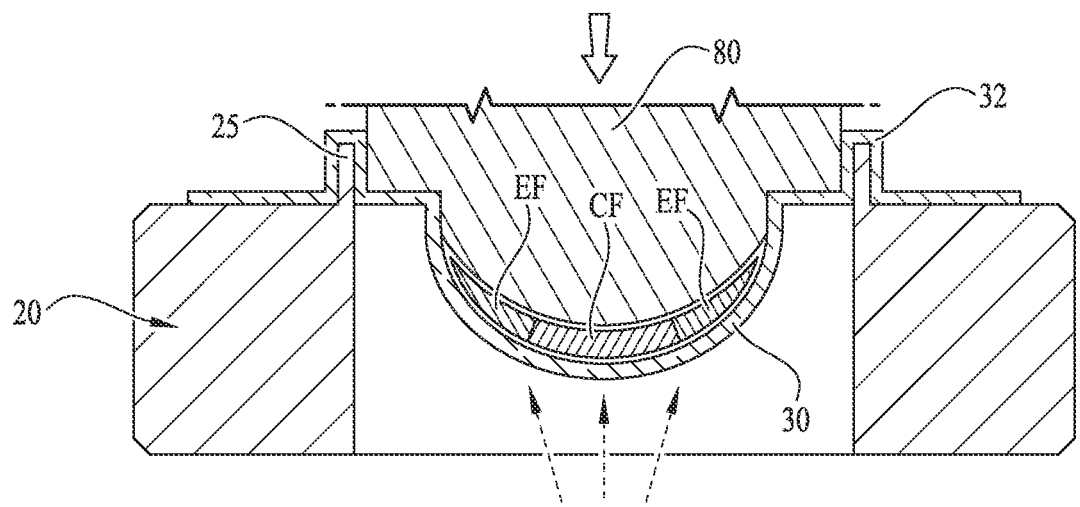
Figure 5C:
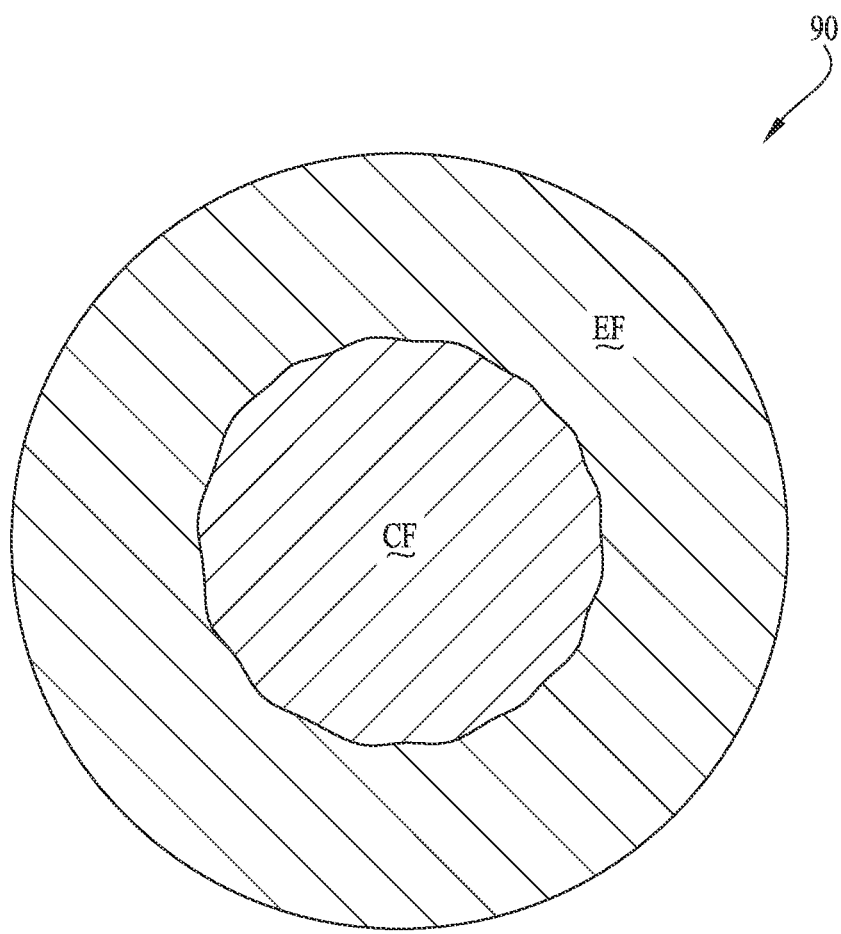

The center lens formulation dosing or delivery system 10 and the edge lens formulation dosing or delivery system 110 may be used independently of one another or may be used together in a sequential lens formulation delivery process. In example embodiments, the center lens formulation CF is delivered to the center of the mold receptacle first, and the edge lens formulation EF is then delivered in a ring-shaped pattern surrounding the dose of center lens formulation CF within the mold receptacle. Alternatively, the ring-shaped pattern of edge lens formulation EF may be delivered into the mold first, and the center lens formulation CF then delivered or dosed inside of the ring of edge lens formulation EF. Lens formulations' properties such as viscosity and surface adhesion may be taken into consideration in determining the delivery or dosing procedure. As shown in example form in FIGS. 5A, 5B and 5C, the center lens formulation CF and the edge lens formulation EF may be delivered or dosed into the mold receptacle of the female or front curve (FC) lens mold half 30 according to a dosing specification for a particular lens or other product to be formed (FIG. 5A). A male or base curve (BC) lens mold half 80 is then advanced into engagement with the female or front curve (FC) lens mold half 30 (FIG. 5B). The edge and center lens formulations are cured for a specified time to form a lens or other product, for example by delivery of light, heat, chemical catalyst, and/or other curing mechanism. In the depicted embodiment the lens formulation is cured by light from a light source projecting through an open or transparent bottom of the carrier 20 and through a light-transmissive portion of the mold 30. The lens halves are then separated, and the cured lens or other product 90 is removed from the lens for further processing, packaging, or use (FIG. 5C).

Lenses produced according to the systems and methods disclosed herein may be, for example, photochromic lenses, ultraviolet (UVA and/or UVB) light energy-blocking lenses, high energy visible light (HEVL) blocking lenses, color blindness correction lenses, diffractive multifocal lenses, and/or other contact lens applications. In particular example embodiments, the lens 90 can be a photochromic lens, with darkening transition material in the center region (CF) and clear material toward the edges (EF). In other examples, the center lens formulation (CF) may be a high UV and/or visible light-blocking material, with clear material toward the edges (EF). In further examples, the center lens formulation (CF) may be a high-viscosity precursor material and the edge formulation material (EF) may be a low-viscosity precursor material, or vice versa. In particular applications, the center lens formulation (CF) and the edge lens formulation material (EF) may be, for example, silicone hydrogels and/or other types of contact lens formulations.

Figure 7:
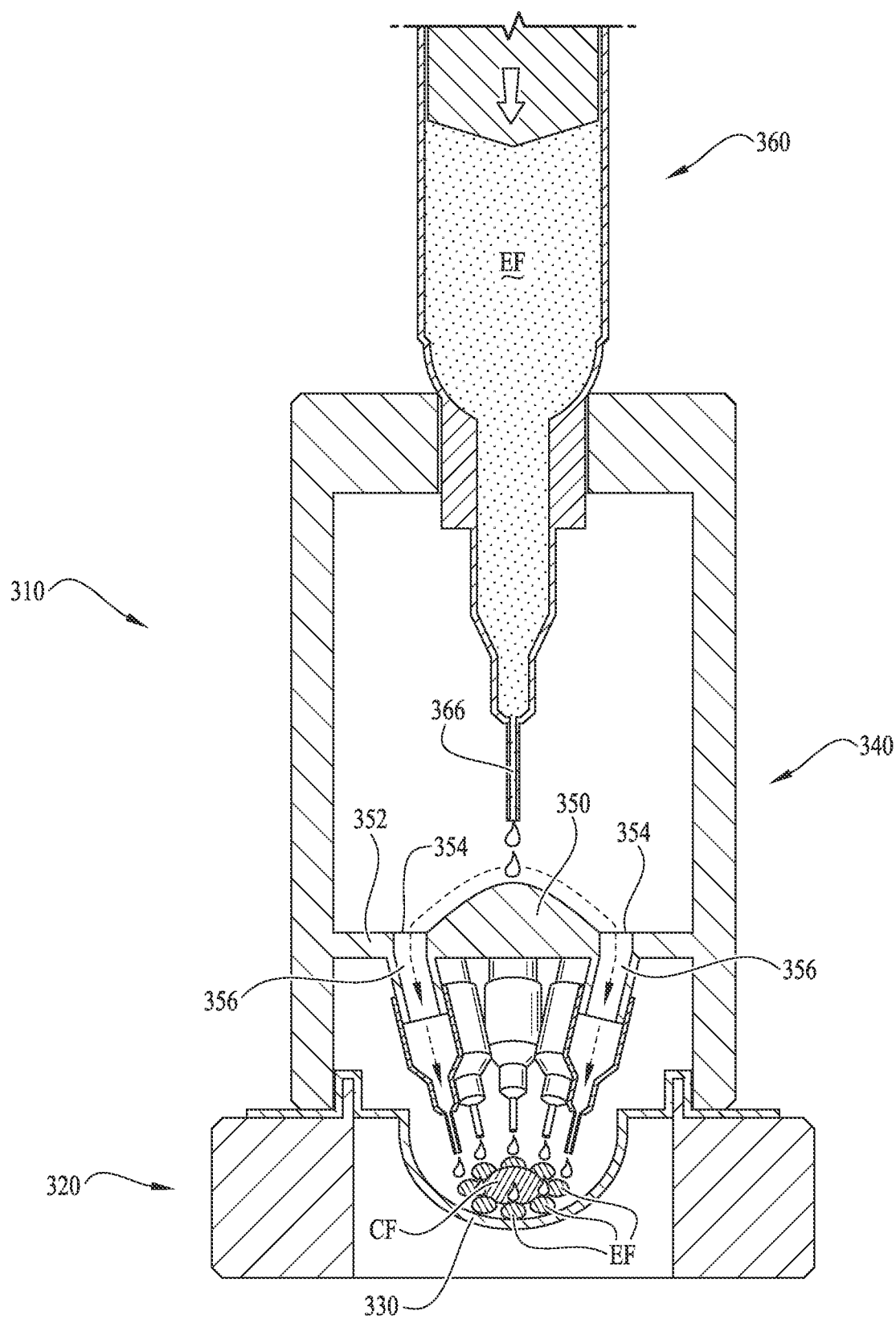
FIG. 7 is a cross-sectional view of the edge lens formulation dosing or delivery device or system of FIG. 6.

FIGS. 6 and 7 show perspective and cross-sectional views, respectively, of another example embodiment of an edge lens formulation dosing or delivery system 310, substantially similar to the above-described embodiment, with differences as noted. The system 310 similarly generally comprises a base or mold carrier portion 320, a mold portion 330, an edge dosing alignment mandrel and distribution portion 340, and an edge lens formulation delivery device 360. A sloped edge lens formulation distribution feature 350 is arranged generally centrally on a shelf 352 extending across the interior chamber of the alignment mandrel and distribution portion 340, beneath the material discharge tip 366 of the delivery device 360 when in use. A ring of openings 354 surround the edge lens formulation distribution feature 350. Optionally, the openings 354 are in fluid communication with downwardly extending tubes or channels 356, through which the edge lens formulation EF is delivered into a ring-shaped pattern in the mold receptacle below. In the depicted example embodiment, the tubes or channels 356 extend downwardly and inwardly, forming obliquely inclined delivery conduits through which the edge lens formulation EF is delivered into a ring-shaped pattern generally circumferentially surrounding and concentric with the center lens formulation CF in the mold receptacle below.

The lens formulation dosing device or system according to example embodiments may be an attachment to an existing dosing set up to make the fabrication of gradient contact lenses with better precision and more consistency or may be a standalone system. In example forms, there is one apparatus or system for the center dosing, and another apparatus or system for the edge dosing. In alternate forms, a single apparatus or system may be reconfigured for use for both center and edge dosing. Advantages of example embodiments may include consistent dosing amount, consistent dosing shapes (circle for center and ring for edge), and/or consistent centration of center and edge doses. For example, embodiments of a center lens formulation dosing device allow connection of a syringe to the top void and front curve (FC) mold to the bottom void. Dispensing a given amount of center lens formulation, it will drop exactly in the center of the FC mold. The center dosing apparatus holds the syringe directly on top of and in the center of the FC mold, so the dose is precisely centered and controlled in the form of a dot every time. In example embodiments of an edge lens formulation dosing device, a syringe is connected to the top void and the FC mold to the bottom void. Dispensing a given amount of edge lens formulation will distribute the edge lens formulation in a ring around the center drop of center lens formulation in the FC mold. Example systems and methods of the invention can be used for fabrication of a variety of lenses with a different center and edge structure composition. Examples include photochromic lenses, high HEVL blocking lenses, and color blindness correction lenses.

While the invention has been described with reference to example embodiments, it will be understood by those skilled in the art that a variety of modifications, additions and deletions are within the scope of the invention, as defined by the following claims.

What is claimed is:

1. A dosing system for delivery of a lens formulation to a contact lens forming mold, the dosing system comprising:
   a carrier portion configured for holding a contact lens mold;
   a lens formulation delivery device; and
   an alignment mandrel configured for retaining the lens formulation delivery device, wherein the lens formulation delivery device is retained in a specified position relative to the contact lens mold for precise location of delivery of the lens formulation within the contact lens mold, wherein the carrier portion comprises a carrier-mold-engagement portion for retaining the mold in a fixed position relative to the carrier portion, wherein the carrier-mold-engagement portion comprises a flange configured for engagement within a channel of the contact lens mold, wherein the flange comprises an annular ring flange projecting upwardly from a top face of the carrier portion, wherein the alignment mandrel comprises an annular base configured for engagement around the annular ring flange of the carrier portion, wherein the annular ring flange of the carrier portion has an outer diameter of between about 20 mm to about 25 mm, wherein the alignment mandrel is an edge dosing alignment mandrel configured to retain the lens formulation delivery device in the specified position for delivery of the lens formulation in a ring-shaped pattern surrounding a center location in the contact lens mold, wherein the edge dosing alignment mandrel comprises an edge lens formulation distribution portion for receiving the lens formulation from the lens formulation material delivery device, the edge lens formulation distribution portion comprising a generally circular array of openings for distributing the lens formulation into the ring-shaped pattern.

2. The dosing system of claim 1, wherein the lens formulation delivery device is a syringe having a syringe barrel and a syringe plunger, and wherein the alignment mandrel comprises a top panel having an opening configured to securely engage the syringe barrel.

3. The dosing system of claim 1, wherein the alignment mandrel is a center dosing alignment mandrel configured to retain the lens formulation delivery device in the specified position for delivery of the lens formulation at a center location in the contact lens mold.

4. The dosing system of claim 3, further comprising a second alignment mandrel for delivery of a second lens formulation in a ring-shaped pattern surrounding the center location in the contact lens mold.

5. The dosing system of claim 1, wherein the edge lens formulation distribution portion further comprises a protuberance having a peak generally centered within the circular array of openings.

6. The dosing system of claim 1, wherein the edge lens formulation distribution portion further comprises downwardly extending tubes in fluid communication with the openings.

7. The dosing system of claim 1, wherein the alignment mandrel is configured for detachable coupling with the carrier portion.

8. The dosing system of claim 2, wherein the edge lens formulation distribution portion further comprises a protuberance having a peak generally centered within the circular array of openings.

9. The dosing system of claim 3, wherein the edge lens formulation distribution portion further comprises downwardly extending tubes in fluid communication with the openings.

10. The dosing system of claim 4, wherein the alignment mandrel is configured for detachable coupling with the carrier portion.

11. The dosing system of claim 2, wherein the alignment mandrel is a center dosing alignment mandrel configured to retain the lens formulation delivery device in the specified position for delivery of the lens formulation at a center location in the contact lens mold.

12. The dosing system of claim 11, further comprising a second alignment mandrel for delivery of a second lens formulation in a ring-shaped pattern surrounding the center location in the contact lens mold.

\* \* \* \* \*